US006404978B1

(12) United States Patent
Abe

(10) Patent No.: US 6,404,978 B1
(45) Date of Patent: Jun. 11, 2002

(54) APPARATUS FOR CREATING A VISUAL EDIT DECISION LIST WHEREIN AUDIO AND VIDEO DISPLAYS ARE SYNCHRONIZED WITH CORRESPONDING TEXTUAL DATA

(75) Inventor: Keiko Abe, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/285,399

(22) Filed: Apr. 2, 1999

(30) Foreign Application Priority Data

Apr. 3, 1998 (JP) .......................... 10-092109

(51) Int. Cl.[7] ............................... H04N 5/93
(52) U.S. Cl. .................... 386/55; 386/52; 707/500.1
(58) Field of Search ........................ 386/46, 52, 54, 386/55; 707/500.1; 345/723, 704; H04N 5/93

(56) References Cited

U.S. PATENT DOCUMENTS 5,359,712 A * 10/1994 Cohen et al. ............... 345/723

| 5,388,197 A | * | 2/1995 | Rayner | 386/54 |
| 5,659,793 A | * | 8/1997 | Escobar et al. | 345/629 |
| 5,801,685 A | * | 9/1998 | Miller et al. | 707/500.1 |
| 6,009,475 A | * | 12/1999 | Shrader | 709/249 |
| 6,185,538 B1 | * | 2/2001 | Schulz | 704/278 |

FOREIGN PATENT DOCUMENTS

| GB | 2 311 677 | 10/1997 |
| GB | 2 312 081 | 10/1997 |

* cited by examiner

*Primary Examiner*—Vincent Boccio
(74) *Attorney, Agent, or Firm*—Frommer Lawrence & Haug LLP; William S. Frommer

(57) ABSTRACT

An editing apparatus for creating an edit decision list by combining a plurality of video materials and/or audio materials in a sequence desired by an operator. Indicator marks are displayed with lengths corresponding to the lengths of specified audio and/or video material or clips, at positions along a time line. An additional indicator mark is displayed at a position specified along the time line corresponding to the amount of inputted textual data that is to be read by an announcer in conjunction with the displayed clips. An operator may create the edit decision list by visual comparison of the audio and/or video indicator marks with the indicator marks for the textual data.

6 Claims, 8 Drawing Sheets

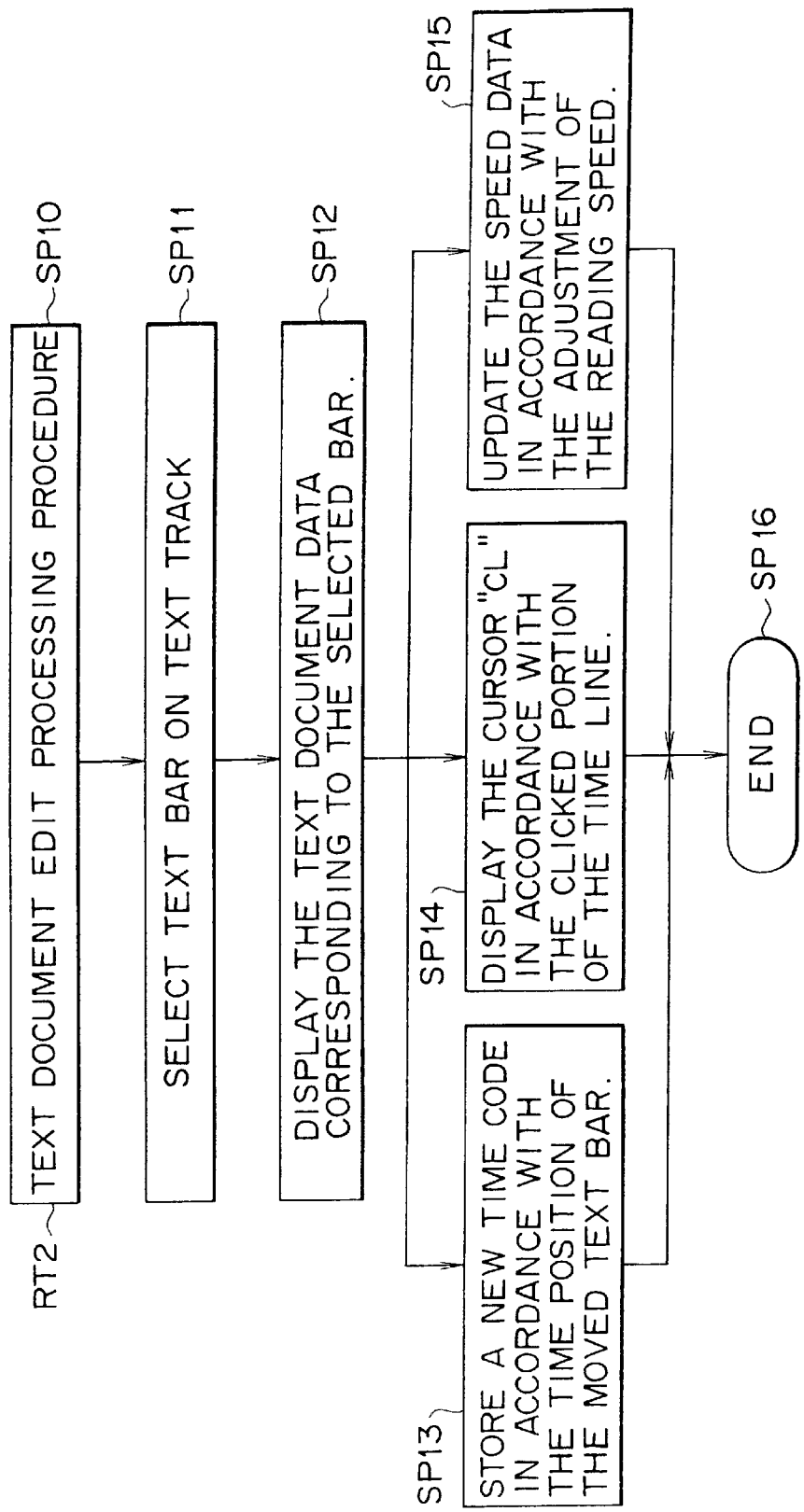

APPARATUS FOR CREATING A VISUAL EDIT DECISION LIST WHEREIN AUDIO AND VIDEO DISPLAYS ARE SYNCHRONIZED WITH CORRESPONDING TEXTUAL DATA

BACKGROUND OF THE INVENTION

The present invention relates to an apparatus for creating an edit decision list which is particularly applicable to the production of broadcast news programs as well as to other types of programs.

Traditionally, when a news program in a broadcast station is produced, the audio/video materials available to an editor to create the program materials used during the actual news broadcast are edited in an editing room of the broadcast station. A journalist creates a text document or script corresponding to video program materials; and the text document is read by a news announcer in accord with the program materials during the news broadcast.

The text document prepared by the journalist is created in accordance with the running time of video program material to be displayed. In other words, the length of time of the text to be used with the video is calculated based on an estimation which considers, for example, the reading speed of the announcer reading the text document.

The editor creates an edit decision list by displaying video images selected from among the audio/video materials stored in a video tape recorder. The corresponding audio display is outputted from a speaker. Using the video display and audio output, the editor prepares an edit decision list (EDL) based on the running time of the program material to be displayed during the news broadcast. The EDL specifies the order of combining clips which the editor has selected from the audio/video materials.

Before the news broadcast begins, the journalist or announcer visually checks the edited audio/video material on a monitor to confirm that the edited audio/video material matches in length of time, the contents of the text document created by the journalist.

There is a current need for an editing apparatus which allows an edit decision list to be created wherein text information corresponding to the audio/video clips selected by the editor from a plurality of stored audio/video materials is displayed with indicators which confirm for the editor that the edited audio/video material matches, in length of time, the contents of the text document created by the journalist.

OBJECT OF THE INVENTION

Therefore, it is an object of the present invention to provide apparatus which makes the editing process of a broadcast program, such as a news program, a more efficient operation.

It is another object of the present invention to provide an apparatus for creating an edit decision list which allows an editor or a journalist to display both audio/video material and a corresponding text document of the program materials which make up the news program in a manner whereby the editor can visually determine if the audio/video materials and corresponding text are synchronized in terms of time.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, there is provided an editing apparatus for combining a plurality of stored video and audio materials in order to produce an edited video and audio display. The editing apparatus comprises an input for inputting textual data and a display for displaying various indication marks. The indication marks have lengths corresponding to, for example, the display time of the video clip. The indication marks are positioned along a time line so an operator can visually check and compare the lengths of the indication marks for the video material, audio material, special effects material or any other additional material. Other indication marks, having lengths which correspond to the amount of inputted textual data also are displayed along a time line.

The indication marks having lengths corresponding to the amount of inputted textual data are displayed in synchronization with the indication marks corresponding to the display time of the specified video and/or audio material or any other material represented by an indication mark. Thus, an operator can make editing decisions by visually comparing the indication marks. For instance, the operator visually compares video material indication marks with textual data indication marks in order to confirm that the video and audio data to be read by the announcer during the news broadcast are synchronized.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIG. 8 is a flowchart indicative of a text document edit processing procedure.

DETAILED DESCRIPTION OF THE EMBODIMENTS

Figure 1:
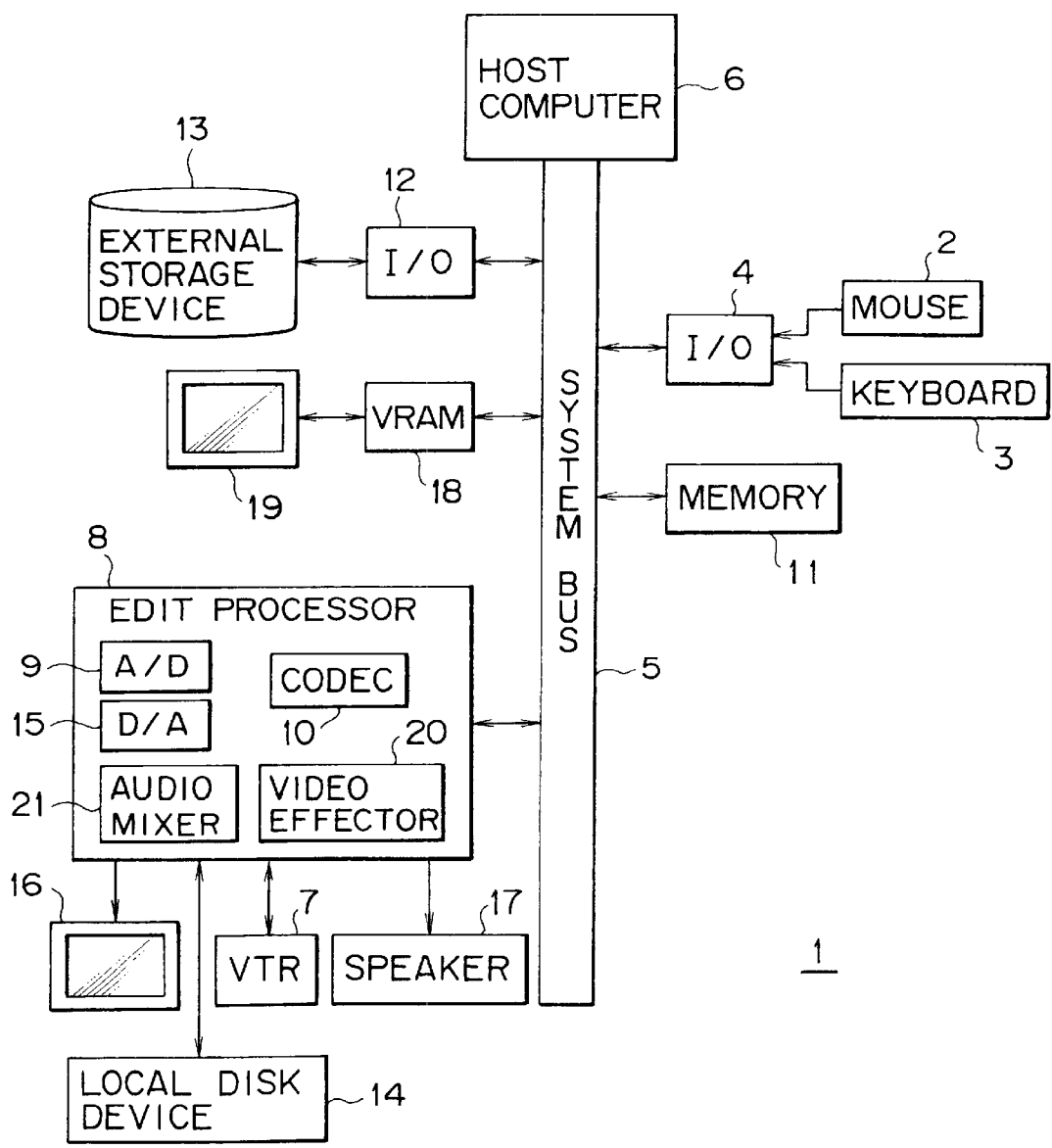
FIG. 1 is a block diagram of an editing apparatus for creating an edit decision list in accordance with a preferred embodiment of the invention.

Referring now to the drawings, FIG. 1 represents a block diagram of an editing apparatus for creating an edit decision list. In this apparatus, user-operated input devices, such as a mouse 2 and a keyboard 3, are connected to a host computer 6 through an input/output circuit 4 and a system bus 5. This allows an operator to issue various commands to the host computer 6 from the mouse 2 and the keyboard 3.

The host computer 6 sends a video signal supplied from a video tape recorder (VTR) 7 to an analog-to-digital (A/D)

converter 9 in an editing processor 8. The analog-to-digital converter 9 converts the supplied video signal into a digital signal and sends the resultant video data and audio data to a CODEC (Coder Decoder) 10 which compresses and encodes the received video and audio data by a predetermined standard such as JPEG (Joint Photographic Coding Experts Group) and stores the resultant data in a memory 11 on a frame basis through system bus 5.

The video and audio data stored on a frame basis in the memory 11 are sequentially read frame-by-frame by the host computer 6 through the system bus 5 and then supplied to a local disk storage device 14 (e.g., a hard drive) through the editing processor 8. At the same time, under the control of the host computer, a new time code is added to these items of data. The data is then arranged into a file to be stored in the local disk device 14.

The host computer 6 reads the stored video and audio data from the local disk device 14, and supplies the read data to the editing processor 8.

The editing processor 8 decompresses the video and audio data supplied from the local disk device 14 to a predetermined baseband by the CODEC 10 and then converts the decompressed data into an analog signal through a digital-to-analog converter (D/A) 15. The resultant video and audio data are sent to a monitor 16 and a speaker 17, respectively, where the corresponding video is displayed and the corresponding audio is reproduced.

Figure 2:
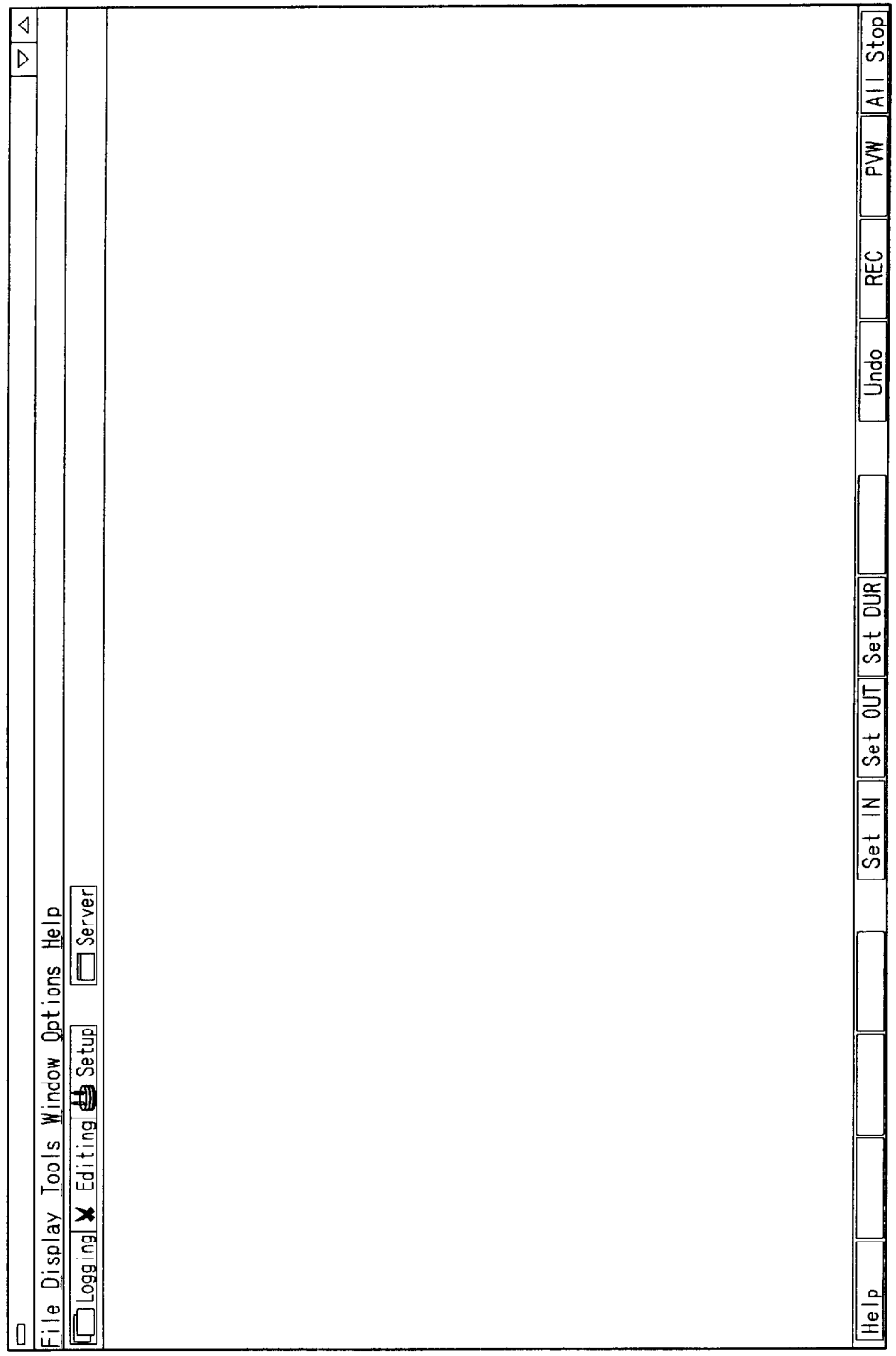
FIG. 2 schematically illustrates one arrangement of a graphical user interface screen in the above-mentioned embodiment.

Based on the video data supplied from the local disk device 14, the editing processor 8 generates image data (hereafter referred to as display image data) for eventual display on a predetermined portion of a monitor. The editing processor stores the generated data in a VRAM (Video Random Access Memory) 18 along with the audio data. Then, the display image data and the audio data stored in the VRAM 18 are read in a predetermined timing relation and sent to a monitor (hereafter referred to as a PC monitor) 19 such as a monitor normally used with a personal computer (PC). Initially, a graphical user interface (GUI) screen 30, as shown in FIG. 2, is displayed on the PC monitor 19.

The file name of an original AV file to be edited is inputted by the mouse 2 or the keyboard 3. The host computer 6 reads the video and audio data corresponding to the original AV file from the local disk device 14 and supplies the data to the editing processor 8 through the system bus 5.

In the editing processor 8, a video effector 20 may be used to alter the video data and an audio mixer 21 may execute various mixing operations on the audio data. The resultant video and audio data is stored in the local disk device 14.

The editing processor 8 decompresses the video data supplied from the local disk device 14 to a predetermined baseband through the CODEC 10 and converts the decompressed data into an analog signal through the digital-to-analog converter 15, the resultant analog signal is stored in the video tape recorder 7.

In addition, based on an operation program stored in the memory 11, the host computer 6 reads the video data from the memory 11 and supplies the video data to the PC monitor 19 as the display image data through the VRAM 18.

The host computer 6 stores the video data corresponding to the original AV file read from the local disk device 14 in the VRAM 18 as display image data, and then the display image data is displayed on the GUI screen on the PC monitor 19.

The GUI screen is partitioned into plural display areas, for example, in three parts in this embodiment. As shown generally in FIG. 2, a clip creating window 40, a selected material display window 41, and a time line window 42 are displayed at predetermined positions on the GUI screen displayed on the PC monitor 19.

Figure 3:
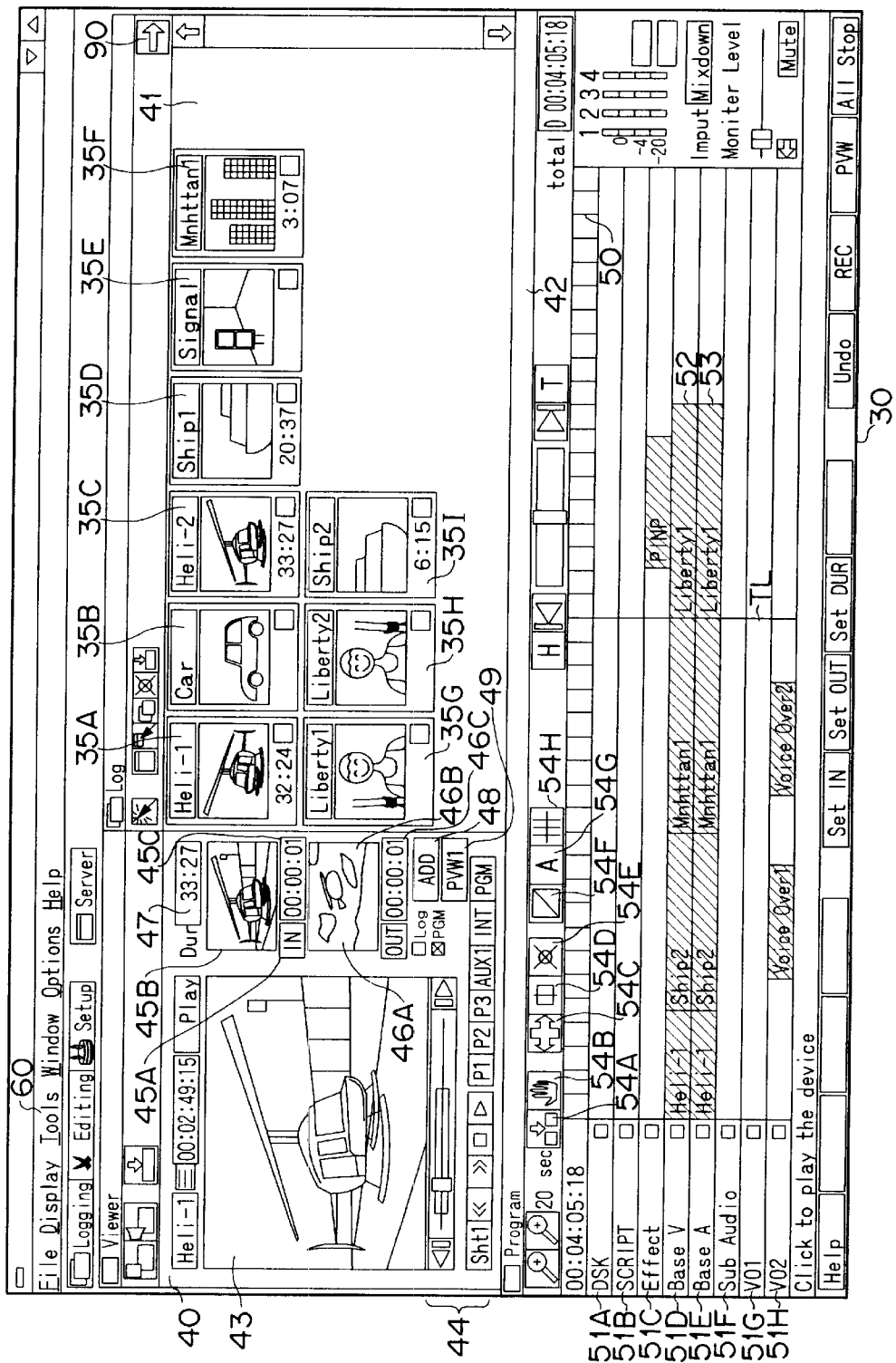
FIG. 3 schematically illustrates another arrangement of a graphical user interface screen in the above-mentioned embodiment.

As shown more particularly in FIG. 3, clip creating window 40 includes three display sections. An image display section 43 displays video material that is edited by an operator to create various "clips", an in-point display section 45B displays the frame image of the in-point of a clip and out-point image display section 46B displays the frame image of the out-point of a clip. The frame images of the in-points from the created clips, once registered, are displayed in the selected material display window 41 so an operator can make editing decisions.

The operator specifies a segment of the audio/video material to be used and by clicking an operation button 44, the local disk device 14 reads out the specified segment. The video reproduced from the local disk device 14 is then displayed on the image display section 43 of the clip creating window 40.

For example, to create the clips, the operator clicks an in-point button 45A and an out-point button 46A to specify an in-point (start point of the clip) and an out-point (end point of the clip). The in-point frame image and time code of the specified in-point are displayed in an in-point image display section 45B and an in-point time code display section 45C respectively. The out-point frame image and time code of the specified out-point are displayed in an output-point image display section 46B and an out-point time code display section 46C respectively. The duration between in-point and out-point (namely, the time length of the clip) is displayed in a duration display section 47.

Having specified an in-point and an out-point of the video material, the operator registers the segment between the in-point and the out-point of that audio/video material as a clip by clicking an add button 48. The frame image of the in-point is then displayed in the selected material display window 41. By specifying the in-point and the out-point as described above, the operator can check the contents of the clip by clicking a preview button 49 which will cause the clip to be read out and displayed.

When a plurality of clips are registered, the operator uses the time line window 42 to perform an editing operation using a "drag and drop" method. The operator moves the cursor to the in-point image of a desired clip in the selected material display window 41 and then presses the button of the mouse 2 to drag the desired clip to a position of the operator's preference along a time scale 50 in the time line window 42. The operator uses the time scale 50 as a reference to drop the clip in a desired position. The operator moves the cursor (not shown) along the time scale 50 to a location thereon that corresponds to a desired position on video track 51D of tracks 51A through 51H arranged along the time scale 50 and releases the button of the mouse 2 in order to complete the drag and drop operation.

The result of dragging a video clip into a position in the time line window 42 is a bar 52, displayed in the video track 51D, having a predetermined color and a length corresponding to the amount of time that the selected clip is to be displayed when outputted. If the audio/video material from which the clip has been made includes audio, a bar 53 having the same length as the bar 52 is displayed on the audio track 51E at the same position along the time scale 50.

The operator repeats the above-mentioned process, thus, placing the clips that were previously created in a desired sequence. The clips are sequentially displayed as bars 52 and 53 on the video track 51D and audio track 51E. The length of the bars indicates the display time for each of the individual clips. The bars continue on the time scale 50 from the first time code on the time scale 50 to a desired time code (namely, a desired length of time).

The displaying of the bars 52 and 53 on the video track 51D and the audio track 51E of the time line window 42 indicates that the video and audio portions of the clip corresponding to the bars 52 and 53 will be displayed and outputted at the times indicated by the time scale 50 when the edited video and audio data are outputted. As a result of the above-mentioned process, an edit decision list is created which sequentially specifies the clips which will be displayed as the edited video and audio data.

It should be noted that, when creating the edit decision list as described above, if a special effect is to be used between or in conjunction with a first clip and a second clip, the operator clicks a special effect select button 54F of the buttons 54A through 54H which are provided for various processing and which are arranged in the upper portion of the time line window 42. As a result, a predetermined window (not shown) containing a plurality of icons (hereafter referred to as effect icons) indicative of various executable special effects is opened on the GUI screen 30. The icon for a desired special effect processing is dragged and dropped at a predetermined time position on the effect track 51C of the time line window 42. Thus, an instruction for executing the special effect processing for the effect icon located at the link between the first and second clip images can be inputted.

As described, using the edit decision list creating apparatus 1, the operator selects desired audio/video material from among the audio/video materials stored in the video tape recorder 7 to create clips by specifying in-points and out-points of the selected material. An edit decision list is created based on the clips produced by the operator.

Figure 4:
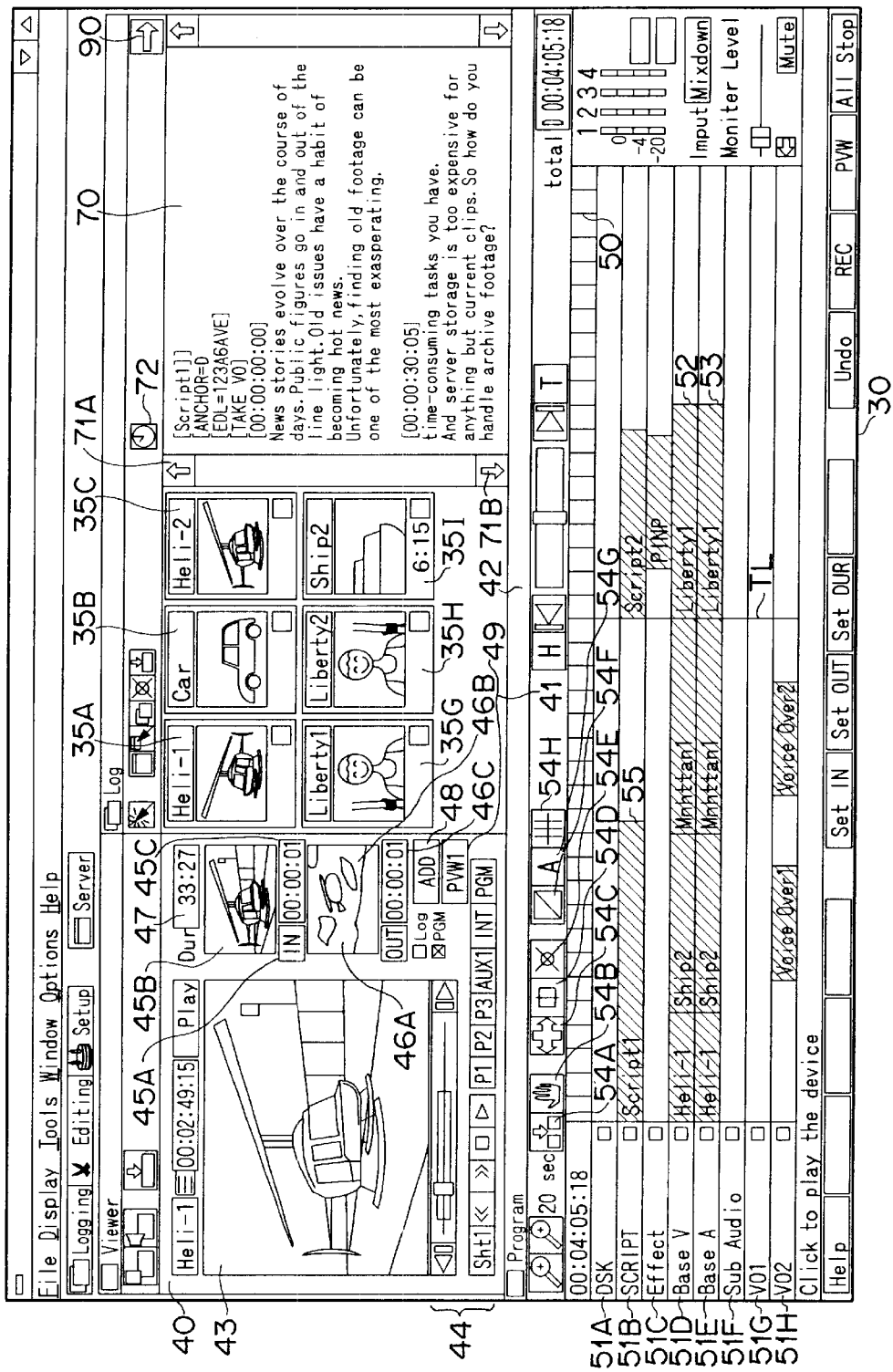
FIG. 4 schematically illustrates a further arrangement of a graphical interface user screen in the above-mentioned embodiment.

In addition to the above-mentioned arrangement, the edit decision list creating apparatus 1 allows an operator to select a tools button 60 in the upper left portion of the GUI screen 30 when the GUI screen 30 display is as shown in FIG. 3. When the tools button is selected, a pull-down menu (not shown) is displayed. Selecting "SCRIPT" from the pull-down tools menu opens the dialog box containing the journalist's script which corresponds to the video. A window as shown in FIG. 4 (hereafter referred to as a text document creating window 70) is displayed at a predetermined position in the selected material display window 41.

In the text document creating window 70, the operator can input textual data. Of course, the textual data becomes the script that is read by the announcer. By pressing either a scroll-up button 71A or a scroll-down button 71B located on the left side of the document creating window 70, the operator can scroll up or down the text document displayed in the text document creating window 70.

Figure 5:
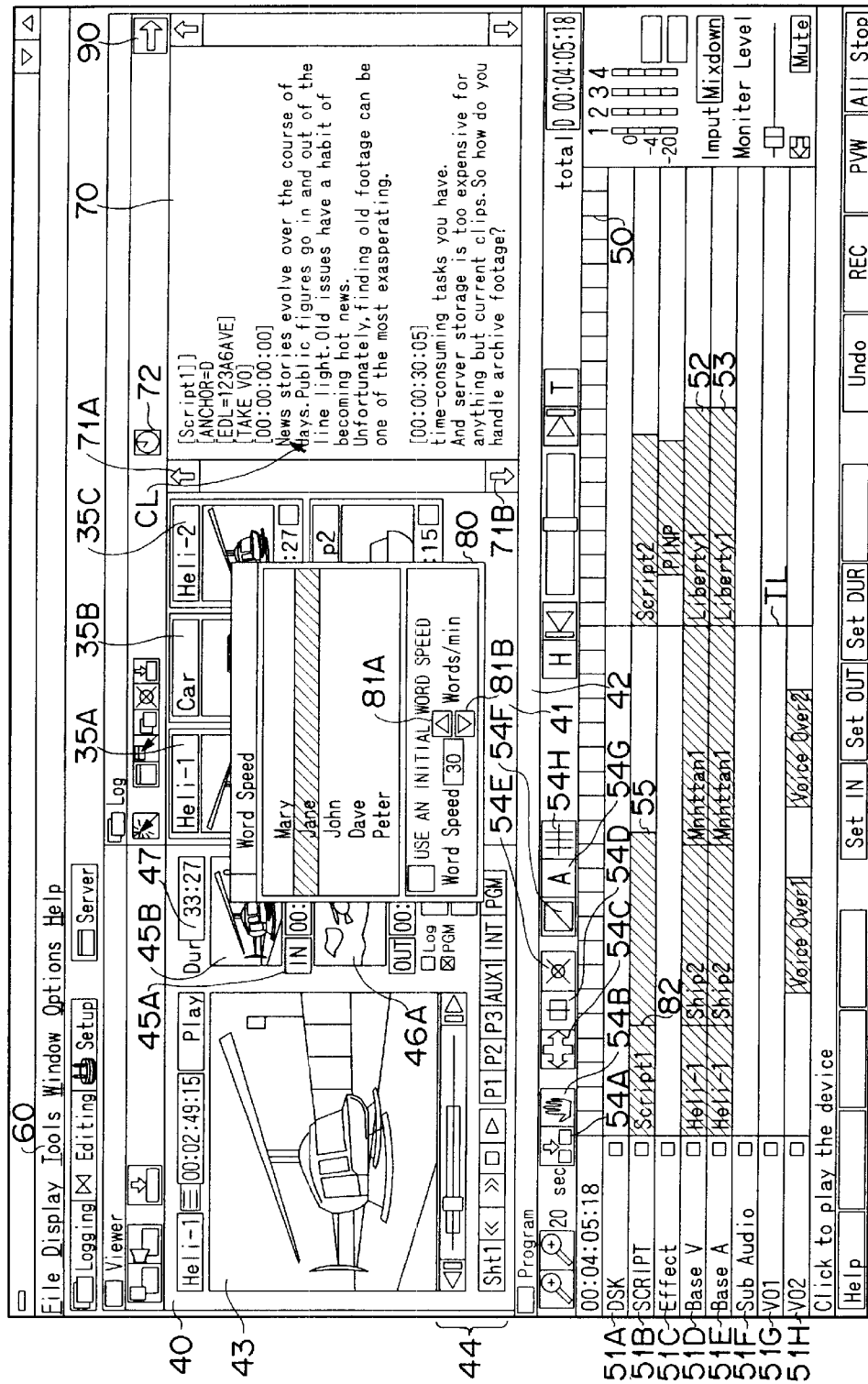
FIG. 5 schematically illustrates yet another arrangement of a graphical interface user screen in the above-mentioned embodiment.
Figure 6:
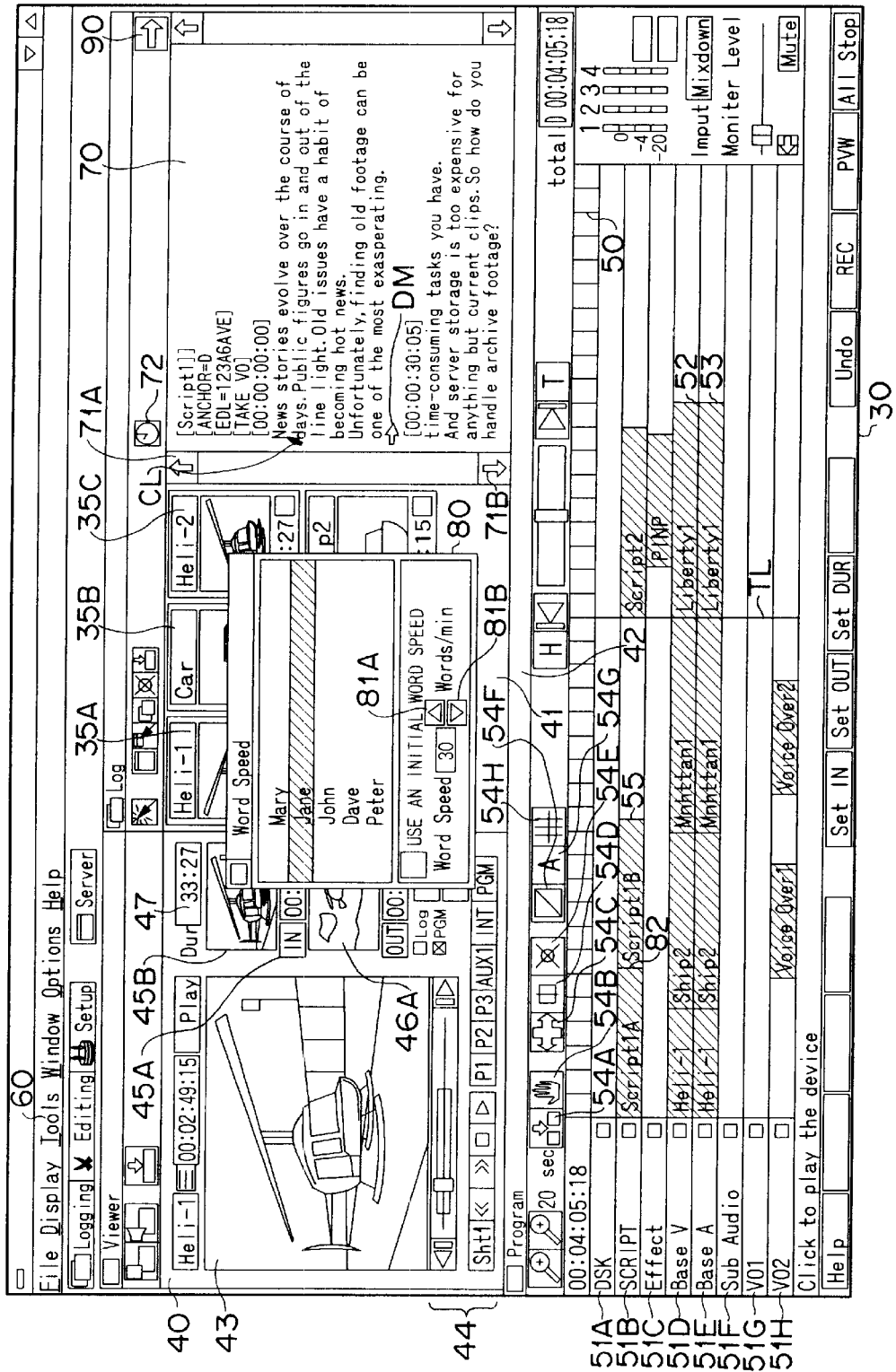
FIG. 6 schematically illustrates yet a further arrangement of a graphical interface user screen in the above-mentioned embodiment.

When the operator selects an icon 72 located in the upper left portion of the text document creating window 70, a window (hereafter referred to as a word speed setting window) 80 as shown in FIG. 5 is superimposed over the frames of selected clips 35A, 35B, 35C, etc., in the center of the GUI screen 30.

Various announcer names are displayed in the word speed setting window 80, anyone of which may be selected by the operator. The speed at which each announcer reads a manuscript (hereafter referred to as a manuscript reading speed) is stored previously, and the manuscript reading speed of the selected announcer is displayed in the lower portion of the word speed setting window 80 as number of words per minute. The setting of the displayed manuscript reading speed may be changed by operating the up or down keys 81A and 81B, respectively.

To input textual data, the operator clicks a desired clip represented by the bars 52 and 53 displayed on the video track 51D and the audio track 51E, respectively, in the time line window 42. A text document creation start mark 82 is displayed on text track 51B corresponding to the time code of the in-point of the selected clip. This makes it unnecessary, when specifying the document creation start position 82, for the operator to directly specify the time code of the in-point of the corresponding desired clip.

When the operator has finished inputting textual data into the text document creating window 70, the host computer 6 displays a text bar 55 in the text track 51B of the time line window 42 having a length corresponding to the number of words of the inputted text document read at the speed at which the selected announcer reads a manuscript. The host computer 6 changes the length of the text bar 55 displayed in the text track 51B in response to an increase or decrease in the number of words in the inputted text document or in response to the selection of a different announcer.

The host computer 6 calculates a reading time for the textual data by dividing the number of words of the inputted text document by the speed data corresponding to the reading speed of the selected announcer and displays text bar 55 with a time length corresponding to the calculated reading time.

To determine if the video material is synchronized with the text document an operator can visually check the text bar 55 displayed on the text track 51B in the time line window 42 as textual data is inputted into the text document creating window 70. The text bar 55 displayed on the text track 51B is displayed with dotted lines (or by flashing) when the operator is inputting textual data. When the inputting of textual data is finished, the text bar 55 is displayed as a solid line.

In the time line window 42, when an operator moves the time line cursor "TL" to a desired position, a corresponding column specification cursor "CL" indicating the position of corresponding textual information is displayed in the left hand column of the text document creating window. The moved time line cursor TL of the time line window and the column specification cursor CL in the text document creating window 70 move in conjunction with each other. When the time line cursor TL is moved to a desired position of the video, the column specification cursor CL moves to the corresponding textual position and vice versa.

When the operator specifies a desired position in the text document by using the column specification cursor CL in the text document creating window 70, the time line cursor TL is moved to the position corresponding to the specified position in the text document.

Furthermore, when the operator moves the time line cursor TL by a drag and drop operation, the video image, represented by the bar on the video track and corresponding to the time code of the time line cursor TL, is displayed in the video display section 43 in the clip creating window 40.

By visually checking the text track 51B of the time line window 42, the operator can create a desired text document in the text document creating window 70 which is not longer in time than the corresponding video clip. Once the text document is created, the operator can adjust the length of the desired clip on the video track 51D and the audio track 51E in the time line window 42 corresponding to that text document, thereby ensuring the text document and the audio/video material are synchronized in terms of time. In other words, the time needed to read the text document is not longer or much shorter than the time needed to view the audio/video material.

When the operator moves the column specification cursor CL to a position where the text document is to be split and clicks the mouse, an arrow mark (hereafter referred to as a division mark) DM is displayed at that predetermined position and the text document is divided into a first half above the division mark DM and a second half below the division mark DM. A new document creation start position 82 on text track 51B is formed at the position of the time code corresponding to the division mark DM.

Figure 7:
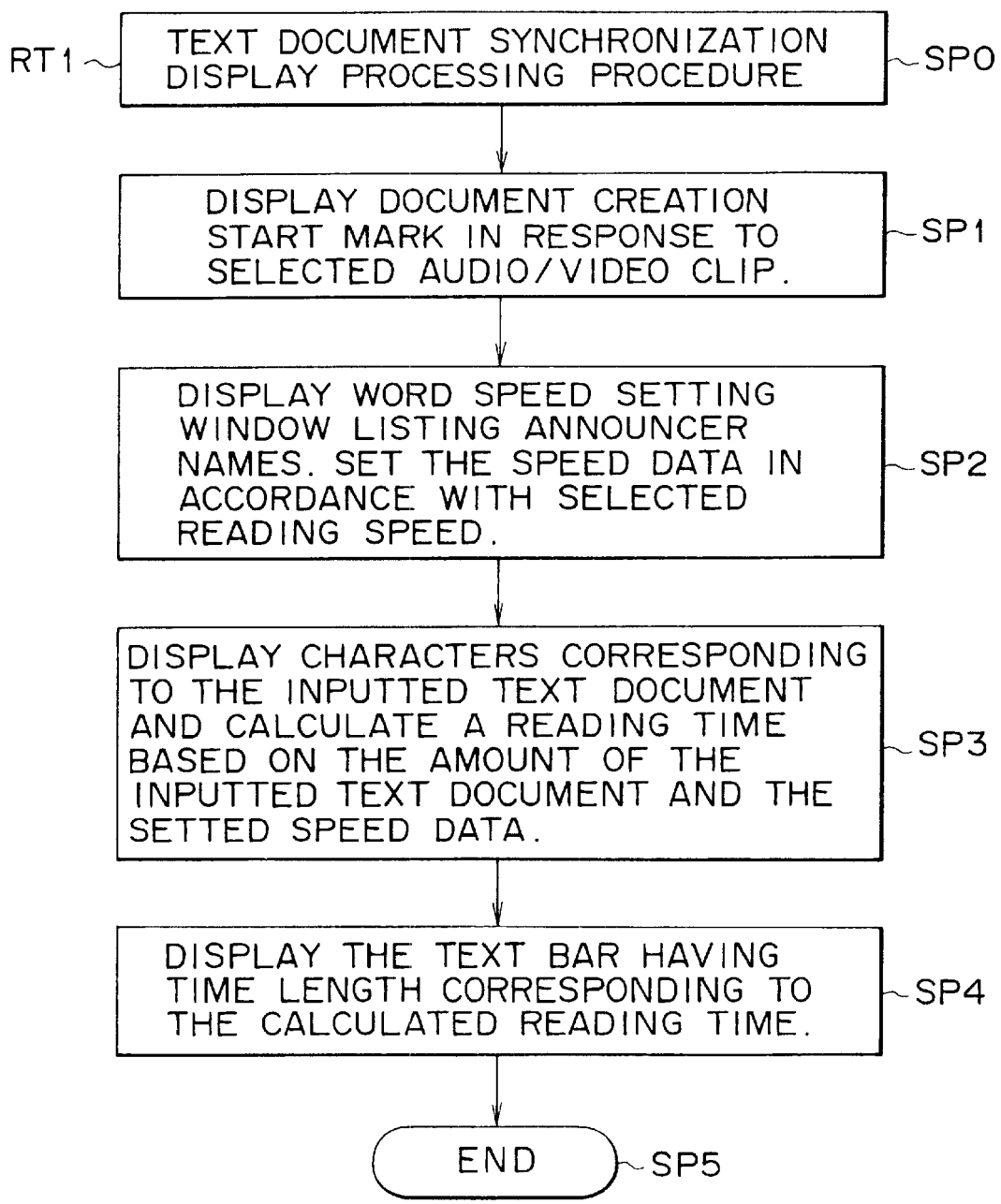
FIG. 7 is a flowchart indicative of a text document synchronization display processing procedure.

The host computer 6 executes the above-mentioned processing operations in the text document creating window 70, the selected material display window 41, and the time line window 42 of the GUI screen 30 according to a text document synchronization display processing procedure RT1 represented by the flow chart shown in FIG. 7.

When the operator selects a display mode, the host computer 6 begins the text document synchronization display processing procedure in step SP0. In step SP1, the operator selects a clip from the several clips displayed as bars 52 and 53 on the video track 51D and the audio track 51E in the time line window 42 in the GUI screen 30. The host computer 6 reads time code data of the in-point of the selected audio/video clip from the memory 11. Then, based on the time code data read from the memory 11, the host computer 6 displays a document creation start mark 82 onto the text track 51B as shown in FIG. 4.

In step SP2, when the operator selects the icon 72, the host computer 6 superimposes the word speed setting window 80 at a predetermined position on the GUI screen 30 displayed on the PC monitor 19 (see FIG. 5). The operator can then select an announcer's name and reading speed. The host computer 6 sets the speed data for the selected clip at step SP2 based on the selected reading speed of the specified announcer.

In step SP3, the operator selects the tools button 60 and then "script" from the pull-down menu, and the host computer 6 displays the text document creating window 70. Now, the operator can input textual data by keyboard operation. The host computer 6 displays characters corresponding to the inputted textual data in the text document creating window 70. At the same time, the host computer 6 calculates the reading time from the amount of inputted textual data and the reading speed of the selected announcer.

The host computer 6 at step SP4 displays the text bar 55 having a length which corresponds to the calculated reading time relative to the document creation start position 82 in the text track 51B. As the text document is inputted in the text document creating window 70, the host computer 6 changes the length of the text bar 55 in the text track 51B according to the amount of textual data being input and the manuscript reading speed of the specified announcer.

In step SP5, the host computer 6 ends the text document synchronization processing procedure RT1.

When the display mode is selected and a desired text document is created in the text document creating window 70 as described above, the host computer 6 enters the text document edit processing procedure RT2 in step SP10 as shown by the flow chart of FIG. 8.

In step SP11, the operator selects one of the text bars 55 on the text track 51B in the time line window 42. The host computer 6 at step SP12 reads the textual data corresponding to the selected text bar 55 from the memory 11 in order to display the textual data in the text document creating window 70.

When the operator has moved the text bar 55 to a desired position along the time scale 50, the host computer 6 stores in memory 11 a new time code in accordance with the time position of the document creation start position 82 of the moved text bar 55 as represented by step SP13. The routine then advances to step SP16, at which the host computer 6 ends the text document edit processing procedure.

Alternatively, if the operator clicks a desired time position on time scale 50 on any track in the time line window 42, the host computer 6 reads the time code data corresponding to the clicked position from the memory 11. Then, the host computer calculates the position in the text document corresponding to this time code, and displays the column specification cursor "CL" on the left side of the text document, as shown by step SP14. Thereafter, the host computer ends the text document edit processing procedure.

As another alternative, if the operator selects the icon 72, the host computer 6 once again superimposes the word speed setting window 80 in the center position of the GUI screen 30. The host computer then updates the manuscript reading speed of the selected announcer and stores the result in memory 11 as speed data when the manuscript reading speed of the selected announcer is adjusted by the operator to a desired value by use of the up and down keys 81A and 81B, respectively, as represented by step SP15. The host computer then may end the text document edit processing procedure.

In the above-mentioned process, the operator selects the text track 51B corresponding to a desired clip and indication marks representing the length of the video clips are displayed on the video track 51D and the audio track 51E. By visually inspecting the indication marks, the operator can determine if the timing and length of the video, audio and textual data are synchronized. The editing apparatus for creating an edit decision list displays the document creation start position 82 at the same time code location as the in-point of the clip on the text track 51B. Then, the operator displays the superimposed word speed setting window 80 and sets the manuscript reading speed of a desired announcer.

The operator displays the text document creating window 70 and inputs textual data thereinto. The time necessary for actually reading the textual data at the above-mentioned set reading speed is calculated, and the calculated length of time is displayed as text bar 55 in the text track 51B with reference to the document creation start position 82, as is seen from FIG. 5.

Consequently, the bars 52 and 53 of the video track 51D and the audio track 51E and the text bar 55 of the text track 51B are displayed in parallel along the time scale 50 in the time line window 42. Therefore, the operator can visually check the length of the audio/video material and that of the text document and easily adjust the timing of the audio/video material cutting point or the timing of the text document start position.

When the operator selects a time code from a position on the text track 51B, a video clip corresponding to the specified time code is displayed on the video track 51D and the text corresponding to that time code is displayed. Therefore, the operator can easily modify the contents of the text document at a desired position along the time scale 50 even after text document creation while visually checking the corresponding video.

According to the above-mentioned process, while textual data is sequentially inputted into the text document creating window 70 of the GUI screen 30, the text bar 55 is displayed on the text track 51B with a length corresponding to the inputted text documents. The text bar is expanded as textual data is input and the text bar decreases if textual data is deleted. Consequently, the text bar 55 can be displayed in time synchronization with the bars 52 and 53 displayed on the video track 51D and the audio track 51E. This novel arrangement allows the operator to visually check the audio/video and text document in order to create an edit decision list in a more efficient manner because the operator can visually determine whether clips are in synchronization with textual data.

In the above-mentioned embodiment, the video data and audio data to be supplied through the system bus 5 under the control of the host computer 6 are stored in the local disk device 14. However, the present invention is not limited to this protocol. For example, the input video data and audio data may be stored in the external storage device 13, which may be formed as a Redundant Array of Inexpensive Disks (or RAID) through the input/output circuit 12.

In the embodiment discussed herein, the input means for inputting text documents is a keyboard and the text document creating window 70 in the GUI screen displayed on the PC monitor 19. However, the present invention is not limited to this arrangement. For example, the input means may be a personal computer externally connected to the edit decision list creating apparatus 1.

As described herein, the bars 52 and 53 displayed on the video track 51D and the audio track 51E and the text bar 55 displayed on the text track 51B are displayed as frames on the time scale 50. Alternatively, these indication marks may be displayed in bars defined by solid or dotted lines, and a character mark may be displayed along the time line as an indication. Essentially, any mark having any distinctive shape or color may be used as an indication if it allows the operator to visually check its length along the time line.

While the present invention has been described as an editing apparatus capable of creating an edit decision list that specifies edit contents for obtaining desired edited video and/or audio by combining a plurality of video materials and/or audio materials, this invention is widely applicable to other display apparatuses that can display textual data in synchronization with audio and/or video materials.

While the present invention has been particularly described with respect to certain preferred embodiments, it will be readily apparent by those of ordinary skill in the art that various changes and modifications may be made without departing from the spirit and scope of the invention.

What is claimed is:

1. An editing apparatus for producing an edited display by combining video and/or audio segments having adjustable display times with one or more textual data scripts having adjustable time durations, comprising:

segments inputting means for inputting the video and/or audio segments script inputting means for inputting the one or more textual data scripts having time durations that correspond to display times of the video and/or audio segments; and display means for displaying indication marks that illustrate the display times of the specified audio and/or video segments at specified positions along a time line and for displaying additional indication marks that illustrate the time durations of said inputted textual data scripts at a position along said time line.

2. The editing apparatus according to claim 1, wherein said additional indication marks illustrating the time durations of the inputted textual data scripts have lengths that are a function of an estimated reading speed at which said inputted textual data will be read.

3. The editing apparatus according to claim 1, wherein said display means displays said inputted textual data scripts; and said display means is operable to select an arbitrary position on one of said additional indication marks to display a predetermined cursor at a portion in the displayed inputted textual data script corresponding to the selected position.

4. The editing apparatus according to claim 1, wherein, said display means is operable to display as a start position of one of said additional indication marks any arbitrary position of said additional indication marks that is selected by a user.

5. An editing apparatus for editing stored display segments, the apparatus comprising:

means for producing a plurality of video clips from stored video materials, wherein a duration of the video clip is defined by all in-point and an out-point;

means for producing a video program by assembling said plurality of video clips;

display means for displaying a graphical user interface comprising a text input window to display input textual data and a time line window to assemble indications of said video clips, said time line window having a video track for displaying a video bar indicator having a length corresponding to said duration of a respective video clip and a text track for displaying a text bar indicator having a length corresponding to an amount of inputted textual data; and control means for controlling said display means to display a time position of said text bar indicator with an associated time position of said video bar indicator and to change said time length of said text bar indicator in response to the amount of textual data that is inputted.

6. The editing apparatus according to claim 5, wherein said textual data of the produced video program is read by an announcer having a predetermined read speed; and wherein said control means is operable to calculate a number of readable words within a predetermined time period as a function of said predetermined read speed to set said time length of said text bar.

* * * * *